(12) United States Patent
Wang

(10) Patent No.: US 11,143,358 B1
(45) Date of Patent: Oct. 12, 2021

(54) CROSS-TYPE TREE SKIRT STAND

(71) Applicant: Centresky Crafts (Shantou) Co., Ltd, Shan Tou (CN)

(72) Inventor: Ruisheng Wang, Guangdong (CN)

( * ) Notice: Subject to any disclaimer, the term of this patent is extended or adjusted under 35 U.S.C. 154(b) by 0 days.

(21) Appl. No.: 16/887,268

(22) Filed: May 29, 2020

(30) Foreign Application Priority Data

May 27, 2020 (CN) .......................... 202010464722.8

(51) Int. Cl.
   *F16M 13/02* (2006.01)

(52) U.S. Cl.
   CPC ....... *F16M 13/02* (2013.01); *F16M 2200/028* (2013.01); *F16M 2200/061* (2013.01); *F16M 2200/08* (2013.01)

(58) Field of Classification Search
   USPC .............. 248/220.1, 220.22, 221.11, 222.11, 248/222.12, 223.31; 5/99.1
   See application file for complete search history.

(56) References Cited

U.S. PATENT DOCUMENTS

| 2,011,528 A | * | 8/1935 | Seay | ...................... | A47C 13/00 256/26 |
| 6,892,784 B2 | * | 5/2005 | Maas | ....................... | A47G 5/00 16/319 |
| 2009/0146123 A1 | * | 6/2009 | Hewitt | ...................... | E01F 7/02 256/45 |

FOREIGN PATENT DOCUMENTS

CN 211173375 U * 8/2020

* cited by examiner

*Primary Examiner* — Alfred J Wujciak

(57) ABSTRACT

The present disclosure, pertaining to the technical field of tree skirt stands, relates to a cross-type tree skirt stand including a plurality of tree skirt stand units that are engaged with each other, the tree skirt stand unit being formed of two fixation bars that are rotatably connected to each other, an insertion member and an insertion slot being respectively connected to upper and lower ends of the fixation bar, the insertion member and the insertion slot being engaged with each other, one of the fixation bars being provided with upper and lower retaining protrusions, a tree skirt fixation member being connected to a side wall of the insertion slot. The tree skirt stand according to the present disclosure has a small volume, and is convenient to be transported and stored. In addition, the difficulty of deployment and disassembling is lowered.

7 Claims, 4 Drawing Sheets

CROSS-TYPE TREE SKIRT STAND

TECHNICAL FIELD

The present disclosure pertains to the technical field of tree skirts, and in particular, relates to a cross-type tree skirt stand.

BACKGROUND

Tree skirts may decorate and protect plants (for example, plants such as Christmas trees that embody the subject of festivals, and plants such as daily household green plants for decoration or the like). Conventional tree skirts are tiled on the article, and thus no three-dimensional effect is achieved. Tree skirt stands refers to frames for fixing the tree skirts. During use of the tree skirt stand, the tree skirt stand is generally deployed around the plant, and are fixed to each other by connecting all the parts of the tree skirt stand.

Conventional tree skirt stands are generally connected in series by soft rubber tubes, and the stands are integrally surrounded to a lap by line expansion in the middle of the soft tubes. However, this structure is easily subject to deformation and is not good in appearance. In addition, the conventional tree skirt stand is difficult to disassemble, and is inconvenient for storage and transportation.

Accordingly, a cross-type tree skirt stand is provided to solve the above problems.

SUMMARY

In view of the problems that the tree skirt stand in the related art is difficult to disassemble, occupies a large space, and is difficult to store, the present disclosure provides a cross-type tree skirt stand which features simple disassembling and easy storage.

To achieve the above object, the present disclosure employs the following technical solution: a cross-type tree skirt stand, including a plurality of tree skirt stand units that are engaged with each other, the tree skirt stand unit being formed of two fixation bars that are rotatably connected to each other, an insertion member and an insertion slot being respectively connected to upper and lower ends of the fixation bar, the insertion member and the insertion slot being engaged with each other, one of the fixation bars being provided with upper and lower retaining protrusions, a tree skirt fixation member being connected to a side wall of the insertion slot.

Preferably, an elastic engagement member is fixedly connected to the insertion member, and the insertion slot is provided with an engagement hole, the elastic engagement member mating with the engagement hole.

Preferably, a fixation shaft is fixedly connected to a middle portion of one of the fixation bars, and a middle portion of the other of the fixation bars is provided with a rotation hole, the fixation shaft mating with the rotation hole.

Preferably, the fixation bar is in a Z-shaped structure, and the fixation bar is entirely inwardly bent and arranged in an arc shape.

Preferably, the tree skirt fixation member is a magic tape.
Preferably, the tree skirt fixation member is a hook.
Preferably, the tree skirt fixation member is a magnetic tape.
Preferably, the tree skirt fixation member is a snap.

As compared with the related art, the cross-type tree skirt stand according to the present disclosure has the following merits:

1. By arranging the plurality of tree skirt stand units, under cooperation of the insertion slots and the insertion members, assembling and disassembling of the tree skirt stand are eased, thereby lowering the assembling difficulty.

2. By arranging the fixation bars that are rotatable relative to each other, the tree skirt stand units are folded and stored, and the volume of the tree skirt stand in the disassembled state may be further reduced, thereby facilitating transportation and storage.

3. By arranging the tree skirt fixation member, the fixation of the tree skirt is eased, and the difficulty of deployment and disassembling of the tree skirt is greatly lowered.

REFERENCE NUMERALS AND DENOTATIONS THEREOF

Figure 1:
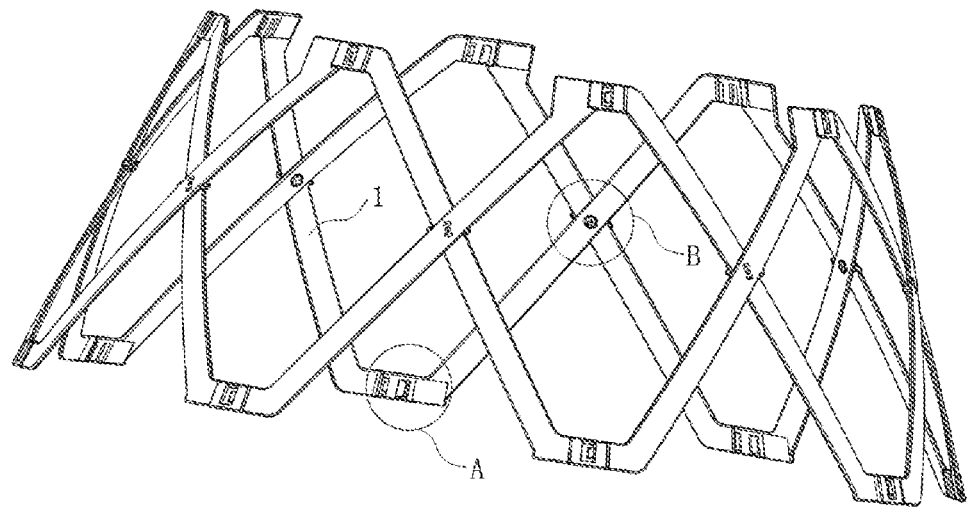
FIG. 1 is a schematic view of an integral structure of a cross-type tree skirt stand according to the present disclosure.
Figure 2:
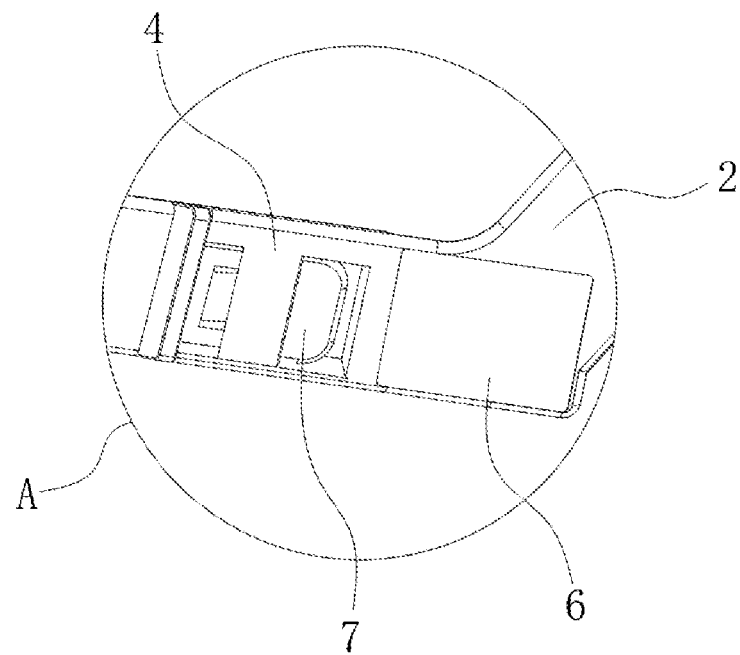
FIG. 2 is a schematic enlarged structural view of A in FIG. 1.
Figure 3:
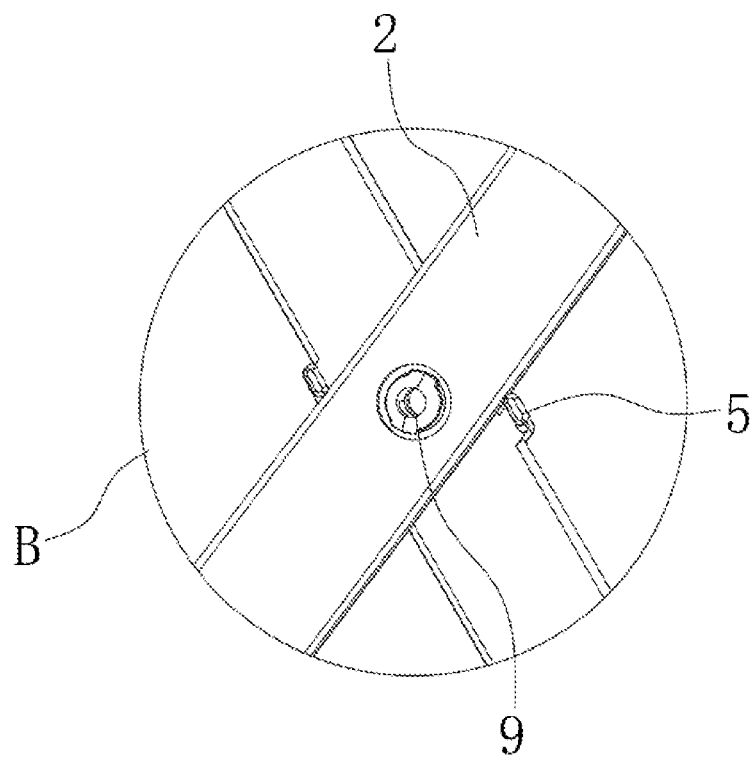
FIG. 3 is a schematic enlarged structural view of B in FIG. 1.

1—tree skirt stand unit, 2—fixation bar, 3—insertion member, 4—insertion slot, 5—retaining protrusion, 6—tree skirt fixation member, 7—elastic engagement member, 8—engagement hole, 9—fixation shaft, and 10—rotation hole.

DETAILED DESCRIPTION

The embodiment hereinafter is only intended to illustrate the present disclosure, instead of limiting the scope of the present disclosure.

Embodiment

As illustrated in FIGS. 1-8, a cross-type tree skirt stand includes a plurality of tree skirt stand units 1 that are engaged with each other. Specifically, eight groups of tree skirt stand units 1 are provided. However, the number of tree skirt stand units 1 is not limited to eight groups, and the product may be expanded to different numbers and groups, and specifications.

The tree skirt stand unit 1 is formed of two fixation bars 2 that are rotatably connected. Specifically, a fixation shaft 9 is connected to a middle portion of one of the fixation bars 2, and a rotation hole 10 is arranged in a middle portion of the other of the fixation bars 2. The fixation shaft 9 mates with the rotation hole 10. By arranging the rotation hole 10 and the fixation shaft 9, the two fixation bars 2 are capable of rotating relative to each other, such that folding and storage of the individual tree skirt stand unit are eased.

Figure 4:
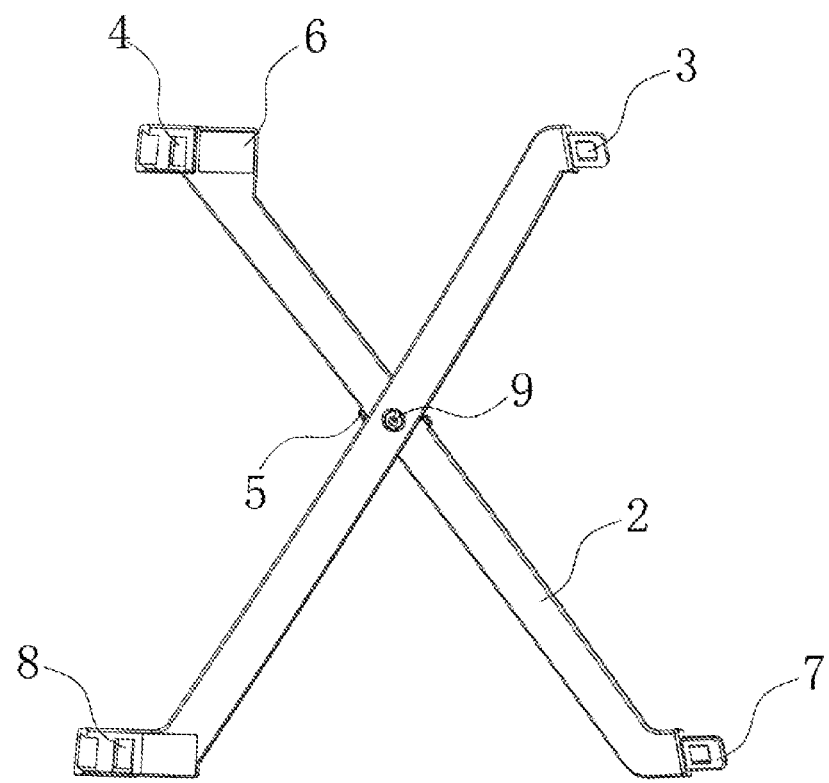
FIG. 4 is a schematic outer-side structural view of a tree skirt stand unit in the cross-type tree skirt stand according to the present disclosure.
Figure 5:
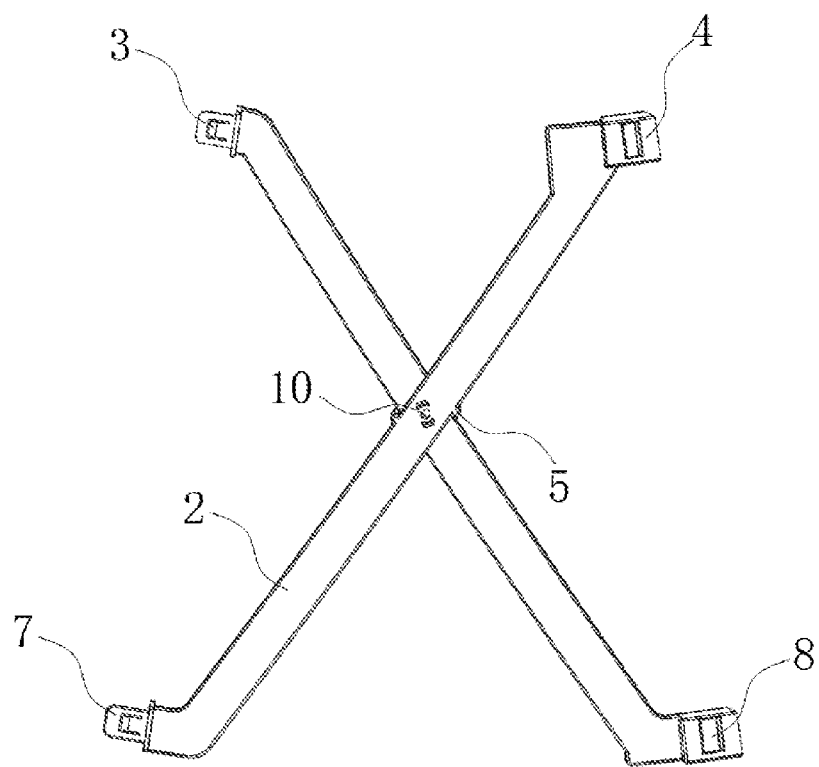
FIG. 5 is a schematic inner-side structural view of the tree skirt stand unit in the cross-type tree skirt stand according to the present disclosure.
Figure 6:
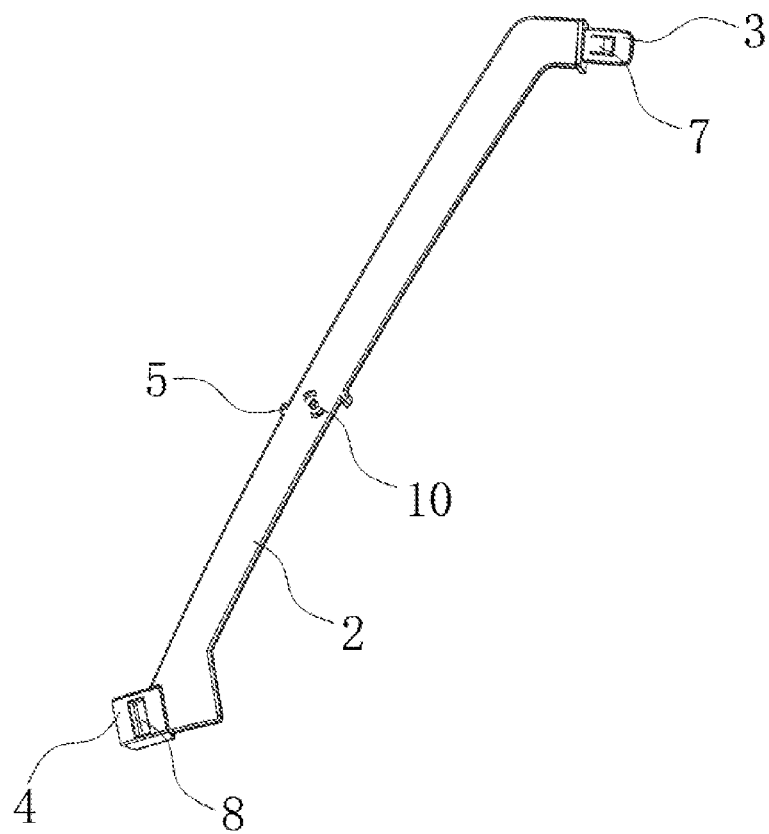
FIG. 6 is a schematic outer-side structural view of an outer side of a fixation bar in the cross-type tree skirt stand according to the present disclosure.
Figure 7:
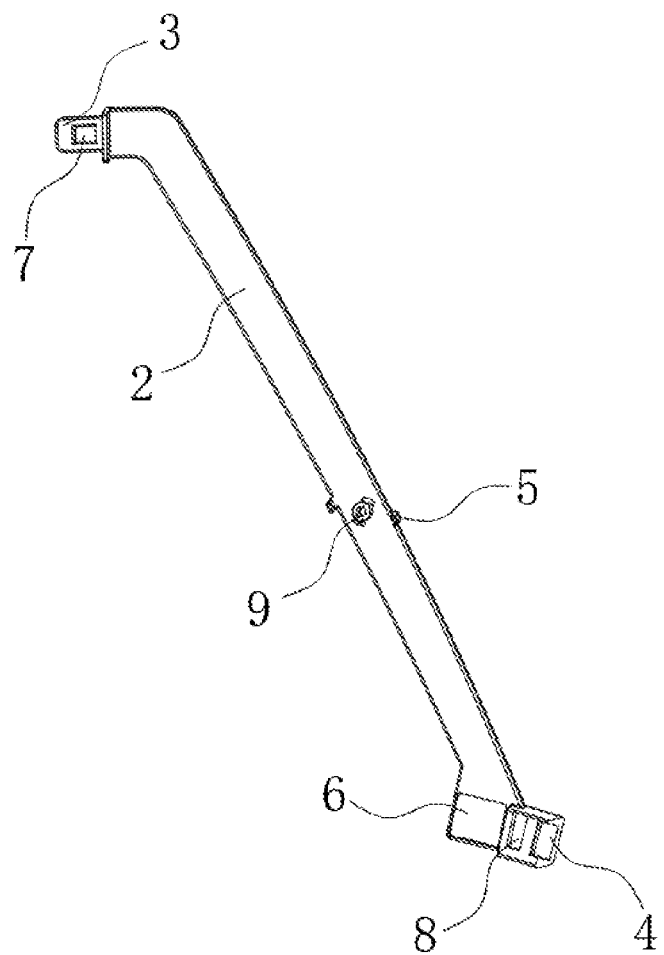
FIG. 7 is a schematic inner-side structural view of the fixation bar in the cross-type tree skirt stand according to the present disclosure.
Figure 8:
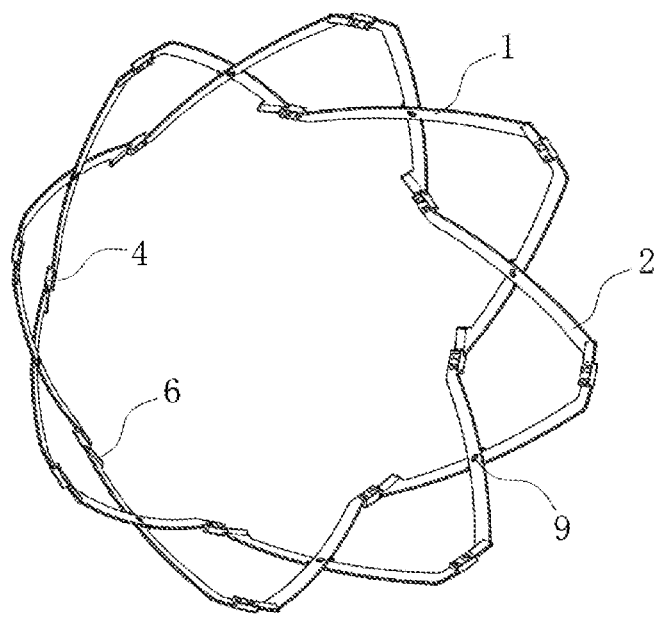
FIG. 8 is a top structural view of the cross-type tree skirt stand according to the present disclosure.

The fixation bar 2 is in a Z-shaped structure, and the fixation bar 2 is entirely inwardly bent and arranged in an arc shape. As illustrated in FIG. 8, an insertion member 3 and an insertion slot 4 are respectively fixedly connected to upper and lower ends of the fixation bar 2. It should be noted that the insertion members 3 of the two fixation bars 2 are arranged on a same side, and the insertion slots 4 of the two fixation bars 2 are arranged on the other side. As illustrated in FIG. 4, for ease of engagement between the adjacent tree skirt stand units 1, the insertion member 3 and the insertion slot 4 are engaged with each other. Specifically, an elastic engagement member 7 is fixedly connected to the insertion member 3, and an engagement hole 8 is arranged on the insertion slot 4. The elastic engagement member 7 mates with the engagement hole 8. Disassembling of the tree skirt stand units are eased under cooperation between the elastic engagement member 7 and the engagement hole 8.

Upper and lower retaining protrusions 5 are arranged on one of the fixation bars 2. By the retaining protrusions 5, a maximum rotation angle between the two fixation bars 2 may be retained. Referring to FIG. 4, when the two fixation bars 2 are rotated to the maximum rotation angle, the insertion slots 4 and the insertion members 3 on the two sides are in a horizontal state, such that the insertion members 3 and the insertion slots 4 are conveniently fixed. In addition, under the effect of the retaining protrusions 5, the structural strength of the entire tree skirt stand may be enhanced, and deformation is not apt to occur.

A tree skirt fixation member 6 is fixedly connected to a side wall of the insertion member 4, and the tree skirt is easily fixed by using the tree skirt fixation member 6. Further, the tree skirt fixation member 6 may employ one or more of a magic tape, a hook, a magnetic tape, and a snap, but is not limited to these fixation members.

The operating principles of the present disclosure are described as follows:

During use of the present disclosure, first the tree skirt stand units 1 are arranged to surround the body of the tree. Then the tree skirt stand units 1 are opened to the maximum rotation angle. As illustrated in FIG. 4, the insertion member 3 is inserted to the adjacent insertion slot 4. By virtue of the elastic engagement member 7 and the insertion hole 8, the tree skirt stand units 1 are engaged with each other to collaboratively define an integral tree skirt stand. Finally, the tree skirt is fixed by using the tree skirt fixation member 6.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A cross-type tree skirt stand, comprising a plurality of tree skirt stand units (1) that are engaged with each other, each tree skirt stand unit (1) being formed of two fixation bars (2) that are rotatably connected to each other, an insertion member (3) and an insertion slot (4) being respectively connected to upper and lower ends of each fixation bar (2), the insertion member (3) from one of the tree skirt stand units (1) and the insertion slot (4) on the other of the tree skirt stand units being engaged with each other, each of the fixation bars (2) being provided with upper and lower retaining protrusions (5), a tree skirt fixation member (6) being connected to a side wall of the insertion slot (4), wherein an elastic engagement member (7) is fixedly connected to the insertion member (3), and the insertion slot (4) is provided with an engagement hole (8), the elastic engagement member (7) mating with the engagement hole (8).

2. The cross-type tree skirt stand according to claim 1, wherein a fixation shaft (9) is fixedly connected to a middle portion of one of the fixation bars (2), and a middle portion of the other of the fixation bars (2) is provided with a rotation hole (10), the fixation shaft (9) mating with the rotation hole (10).

3. The cross-type tree skirt stand according to claim 1, wherein the fixation bars (2) are entirely inwardly bent and arranged in an arc shape.

4. The cross-type tree skirt stand according to claim 1, wherein the tree skirt fixation member (6) is a magic tape.

5. The cross-type tree skirt stand according to claim 1, wherein the tree skirt fixation member (6) is a hook.

6. The cross-type tree skirt stand according to claim 1, wherein the tree skirt fixation member (6) is a magnetic tape.

7. The cross-type tree skirt stand according to claim 1, wherein the tree skirt fixation member (6) is a snap.

\* \* \* \* \*